Nov. 19, 1940.  J. H. DE IONGH  2,222,140
WEIGHING APPARATUS
Filed Nov. 9, 1937  2 Sheets-Sheet 1
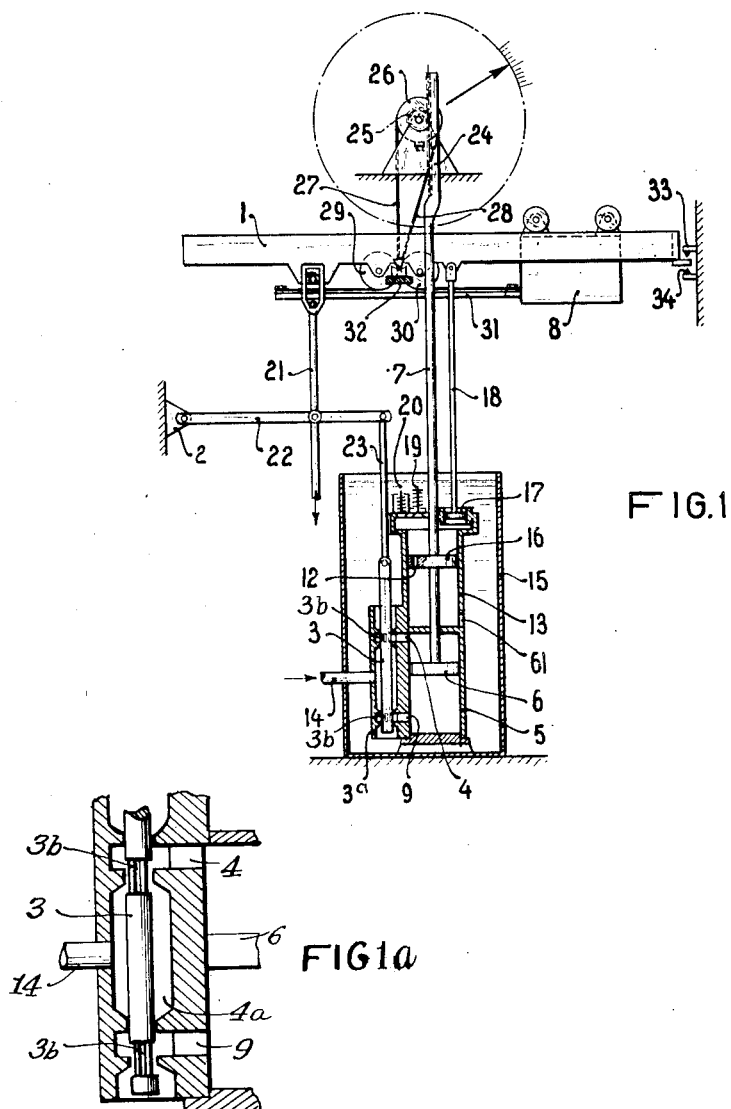
J. H. de Iongh
Inventor
By Glascock Downing & Seebold
Attys

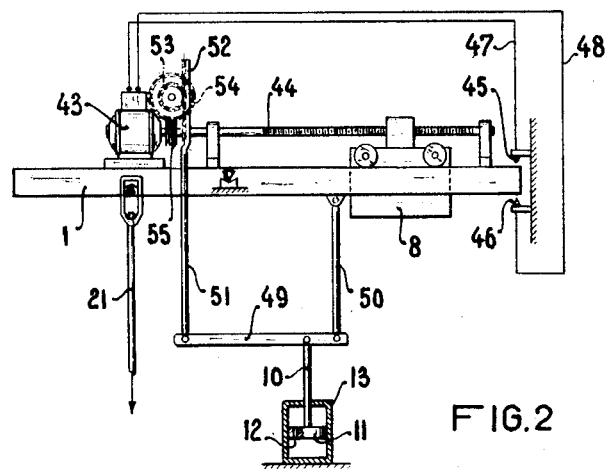
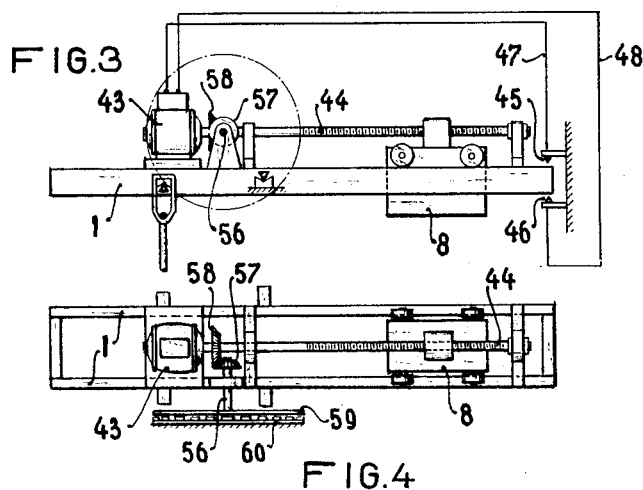

Patented Nov. 19, 1940

2,222,140

UNITED STATES PATENT OFFICE 2,222,140

WEIGHING APPARATUS

Johan H. de Iongh, Wassenaar, Netherlands

Application November 9, 1937, Serial No. 173,676
In the Netherlands November 14, 1936

4 Claims. (Cl. 265—56)

This invention relates to weighing apparatus of the known type comprising a servomotor adapted, under the control of the weighing lever, to displace a travelling poise against which the load automatically balances itself, and its primary object is the provision of improved means whereby oscillations of the weighing lever about its neutral position, or position of equilibrium are completely or almost completely suppressed.

With this object in view, the invention contemplates the provision, in weighing apparatus of the aforesaid type, of a servomotor which, when operating, not only displaces the travelling poise, but in addition exerts an auxiliary force on the weighing lever, or on a part associated therewith, tending to restore the same into its neutral position. The action of this auxiliary force results in a substantial reduction of the time required for the weighing lever to resume its initial position, which is the position wherein the servomotor is inoperative.

The auxiliary force may be so adjusted that the weighing lever during its return movement will not, or not appreciably deflect beyond its position of equilibrium.

Since the magnitude of the auxiliary force is reduced to zero at the moment wherein the action of the servomotor ceases, this force does not affect the position of equilibrium of the weighing lever.

In accordance with this invention, the apparatus may further be so arranged that the magnitude of the auxiliary force varies with the balancing speed of the servomotor, in such a manner that said force is gradually reduced to zero as the weighing lever approaches its neutral position.

In order that the invention may be fully understood by those skilled in the art, it will be described hereinafter with reference to the diagrammatic drawings, in which:

Fig. 1 shows a side elevational view, partly in section, of weighing apparatus provided with a hydraulic servomotor, Fig. 1a is an enlarged sectional view of the distributing valve arrangement shown in Fig. 1.

Fig. 2 is a side elevational view, partly in section, of a similar weighing apparatus provided with an electric servomotor and mechanical means for transmitting the auxiliary force to the weighing lever, Fig. 3 is a side elevational view of similar weighing apparatus provided with an electric servomotor and electrodynamic means for transmitting the auxiliary force to the weighing lever, and Fig. 4 is a plan view of the apparatus shown in Fig. 3.

In Fig. 1, the numeral 1 designates the double armed beam of the weighing apparatus. Said beam is adapted, when deflecting under the action of a load suspended therefrom, to actuate a servomotor. A travelling poise 8 is adapted to be displaced along said beam by the servomotor, thereby tending to restore the beam 1 into its initial or neutral position.

The servomotor here comprises a hydraulic cylinder 5 and a piston 6 movable therein. Mounted on the top of this cylinder and co-axial therewith is a second cylinder 13, the piston 16 of which is secured to the rod 7 of the piston 6 and is provided with a narrow passage 12. Provided in the top cover of cylinder 13 is a third, small cylinder, in which is a piston 17 connected through a rod 18 with the beam 1.

The composite cylinder, formed of the cylinders 5 and 13, is supported in an upright position on the bottom of a tank 15 filled with oil or another suitable fluid. The top cover of the cylinder 13 is provided, below the level of the oil in the tank, with a spring loaded inlet valve 19 and with a spring loaded outlet valve 20, whereas the lower part of the cylinder 13 communicates with the tank 15 through a port 61.

The load is adapted to be suspended from the left hand side arm of the beam 1 through a rod 21 having a pivotal connection with a substantially horizontal lever 22, the left end of which is hinged to a fixed bracket 2 and the right end of which is pivoted to a rod 23 flexibly coupled with the distributing valve 3 of the hydraulic cylinder 5. Said valve is movable in a valve casing 3a communicating through ports 4 and 9 with the cylinder 5, and connected through a pipe 14 with the pressure side of an oil pump not shown. The suction side of the pump is connected to the tank 15. The distributing valve 3 is formed of a solid rod provided with recesses 3b as shown more clearly in Fig. 1a.

Secured to the upper end of the piston rod 7 is a rack 24 meshing with a pinion 25 keyed to the shaft of a roller 26. Flexible metallic straps 27 and 28, which are passed in opposite directions over and secured with their one ends to said roller, are led over guide pulleys 29 and 30, respectively, and connected with their other ends to the left and to the right end, respectively, of a bar 31 secured to the travelling poise 8. The pulleys 29 and 30 are rotatably mounted on the beam 1 in such a manner that the straps 27 and 28 pass approximately through the axis of rotation 32 of the beam, so that they cannot exert any turning moment thereon.

Fixed stops 33 and 34 mounted in the vicinity of the right hand side end of beam 1 limit the deflection of the beam in either direction.

As long as there is no load suspended from the rod 21, the poise 8 assumes an extreme left position on the right hand side arm of beam 1, the pistons 6 and 16 are in their top positions, and the beam is horizontal. When a load is applied to the rod 21 the beam 1 turns in a counterclockwise direction so as to engage the limit stop 33. As the rod 21 moved downwardly the lever 22 turns in a clockwise direction so that the rod 23 together with the valve 3 are forced downwardly. In this position of the valve 3 the upper series of recesses 3b permit communication between the chamber 4a of the valve casing and the upper port of the cylinder 5 as shown in Fig. 1a so that oil under pressure enters the cylinder 5 through the port 4. The cylindrical portion of the valve 3 immediately above the lower series of recesses 3b prevents the oil under pressure from passing into the lower port of the cylinder 5 and the lower series of recesses in this position of the valve 3 allow the fluid within the lower port of the cylinder 5 to escape through the port 9 into the tank 15. Thus the piston 6 is forced downwardly whereby the rack 24 turns the pinion 25 and the roller 26 in a clockwise direction and the strap 27 pulls the poise 8 to the right.

Simultaneously, the downward movement of the piston 16 reduces the pressure in the upper part of cylinder 13 and thus causes the piston 17 to descend. This movement of the piston 17 is transmitted, through the rod 18, to the right hand side arm of the beam 1. The magnitude of this downwardly directed auxiliary force is adapted to be adjusted by varying the strength of the spring whereby the inlet valve 19 is loaded. If the tension of said spring has the proper value, the movement of the travelling poise 8 ceases the moment the beam resumes its horizontal position of equilibrium. The same result can be attained by properly adjusting the cross-sectional area of the narrow passage 12. Adjustment of the spring tension is, however, more convenient.

If the beam 1 is thereafter unloaded, it will turn in clockwise direction and the valve 3 will be moved up. As a consequence, the hydraulic piston 6 will be raised, the rack 24 will turn the roller 26 in a counterclockwise direction, and the strap 28 will move the travelling poise 8 to the left. Simultaneously, the piston 17 exerts an upwardly directed thrust on the right hand side arm of the beam 1, so as to counteract said deflection of the beam. Proper adjustment of the tension of the spring loading the outlet valve 20 will result in the travelling speed of the poise 8 being reduced to zero the moment the beam attains its horizontal position of equilibrium.

The oil supplied through the pipe 14 to the cylinder 5 escapes into the tank 15, whence it is withdrawn by the oil pump referred to hereinbefore.

In Fig. 2, the travelling poise 8 of the weighing apparatus is adapted to be displaced along the beam 1 by a screw spindle 44 driven, through a suitable reduction gear not shown, by an electromotor 43 mounted on the beam. The electric circuit of said motor is controlled by the beam in cooperation with fixed contacts 45 and 46 connected, through wires 47 and 48, with the motor switch.

In this modification, the auxiliary force for restoring the deflected beam 1 into a neutral position is supplied by the electromotor 43 in cooperation with a device comprising a brake cylinder 13 filled with oil and a piston 11 movable therein. Said piston is provided with a narrow passage 12 and is hinged through its rod 10 to a point intermediate the ends of a floating lever 49. The right end of the lever 49 is suspended through a rod 50 from the right hand side arm of the beam 1, whereas the left end of the lever 49 is pivoted to a rod 51, the upper end of which has a rack 52 in mesh with a pinion 53. This pinion is keyed on the shaft of a worm wheel 54 coacting with a worm 55 on the screw spindle 44.

If the load is applied to the left hand side arm of beam 1 through the rod 21, it causes the beam to turn in a counterclockwise direction, thereby closing the contact 45 and starting the motor 43. Consequently, the screw spindle 44 is driven so as to move the poise 8 to the right to balance the load. Simultaneously, the rod 51 and the piston 11 are moved upward owing to the rotation of the pinion 53, so that the rod 50 pulls the right hand side arm of the beam 1 down to its initial position whereby the contact 45 is broken and the motor 43 is stopped.

If the load is wholly or partly removed the right hand side arm of the weighing beam 1 deflects downwardly thereby closing the contact 46 and starting the motor 43 in a reversed direction. Consequently the screw spindle 44 is now driven so as to move the poise 8 to the left and the rod 51 is moved downward so that pressure is set up in the cylinder 13 below the piston 11 which exerts an upwardly directed force on the beam 1. The beam is, therefore, restored into its neutral position whereby the contact 46 is broken and the motor 43 is stopped.

In the embodiment shown in Figs. 3 and 4, like parts are designated by the same references as in Fig. 2. Mounted in bearings of the beam 1 is a shaft 56 transversely to the screw spindle 44. Said shaft is coupled through gear wheels 57 and 58 with said spindle and carries at its free end a disk 59 of non-magnetic metal. Opposite this disk is a stationary disk 60 provided with a circular series of permanent magnets adapted to induce eddy currents in the revolving disk 59, thereby braking the same so as to exert on the beam 1 a turning moment, which tends to restore the beam into a neutral position. The magnitude of this moment increases and decreases with the rotary speed of the disk 59, or with the rotary speed of the servomotor 43, and is reduced to zero the moment said motor stops.

If a load is applied to the left side arm of the beam 1 it turns in a counterclockwise direction, thereby closing the contact 45 and starting the motor 43. Consequently, the screw spindle 44 is driven so as to move the poise 8 to the right to balance the load and the disk 59 exerts on the beam a turning moment which tends to turn the beam back to its neutral position. Thereby contact 45 is broken and the motor 43 is stopped.

If the load is wholly or partly removed the right arm of the weighing beam 1 deflects downwardly thereby closing the contact 46 and starting the motor 43 in a reversed direction. The screw spindle 44 is now driven so as to move the poise 8 to the left and the disk 59 is also rotated in a reversed direction so that it exerts on the beam a turning moment which tends to restore the beam to a neutral position. Thereby the contact 46 is broken and the motor 43 is stopped.

What I claim is:

1. In a weighing apparatus, a weighing lever, a travelling poise on said lever, a hydraulic cylinder having a distributing valve associated with said lever, a piston movable in said hydraulic cylinder, means operatively connecting said piston with said poise, a second piston connected to said first piston and movable in a second cylinder filled with liquid, a third cylinder communicating with said second cylinder and having a third piston movable therein so as to cooperate with said second piston, and means connecting said lever with said third piston.

2. In a weighing apparatus, a weighing lever, a travelling poise on said lever, a hydraulic cylinder having a distributing valve, means operatively connecting said lever with said valve, a piston movable in said hydraulic cylinder, means operatively connecting said piston with said poise, a second piston connected to the first piston and movable in a second cylinder filled with liquid and provided with spring loaded inlet and outlet valves, a third cylinder communicating with said second cylinder and having a third piston movable therein so as to cooperate with said second piston, and means connecting said lever with said third piston.

3. In weighing apparatus, a weighing lever, a travelling poise on said lever, a servomotor controlled by deflection of said lever, means actuated by the servomotor for displacing the poise on said lever, and means continuously coupled to the servomotor and actuated thereby to continuously exert an auxiliary force on said lever for restoring the same to a neutral position when the servomotor is actuated by deflection of the weighing lever.

4. In weighing apparatus as claimed in claim 3 wherein the means for continuously exerting the auxiliary force is so connected to the servomotor that the magnitude of the auxiliary force on the weighing lever varies with the speed of the servomotor.

JOHAN H. de IONGH.